June 14, 1927.
S. F. FLETCHER ET AL
1,632,224
DIRIGIBLE HEADLIGHT CONSTRUCTION FOR AUTOMOBILES
Filed Aug. 31, 1926
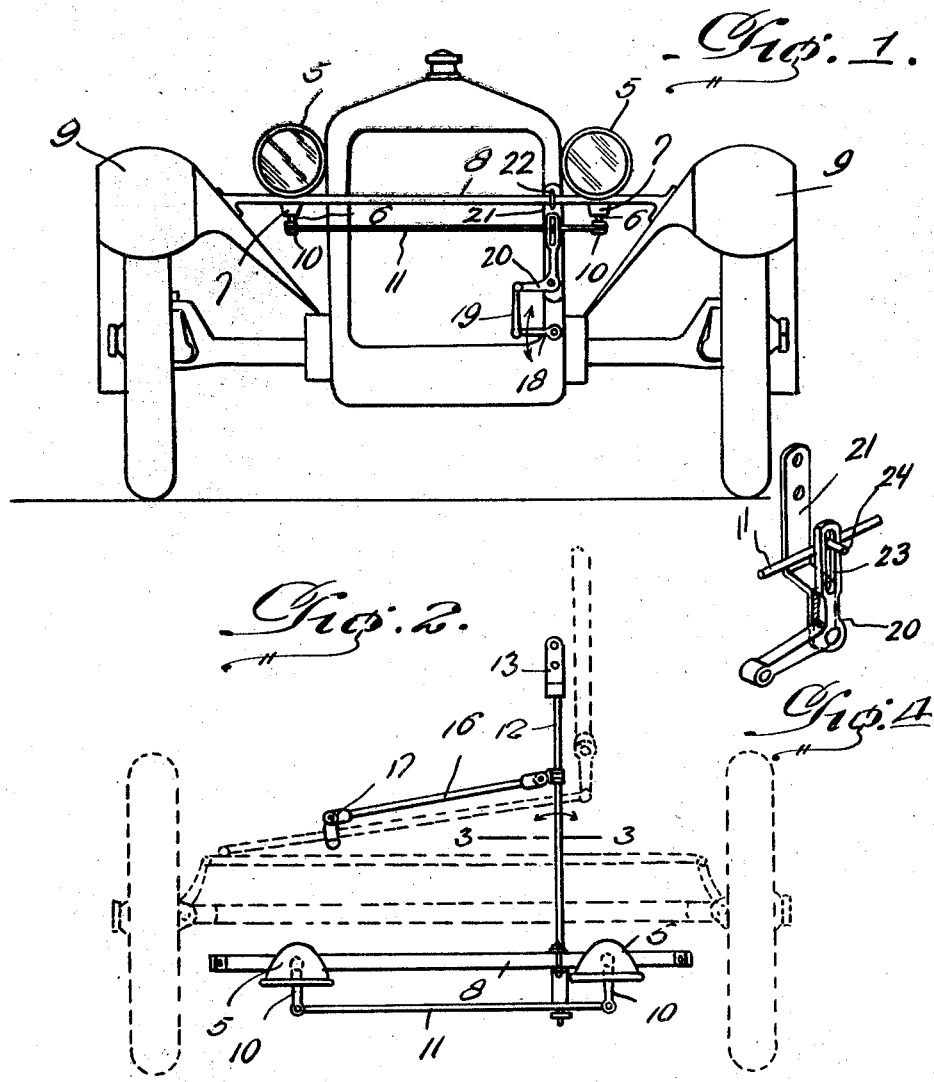
Inventors
S. F. Fletcher,
H. J. Smith,
By Clarence A. O'Brien
Attorney Patented June 14, 1927.

1,632,224

UNITED STATES PATENT OFFICE.

SQUIRE FRANKLIN FLETCHER AND HARRY J. SMITH, OF LOWELL, INDIANA.

DIRIGIBLE HEADLIGHT CONSTRUCTION FOR AUTOMOBILES.

Application filed August 31, 1926. Serial No. 132,758.

This invention relates to automobile headlights of the dirigible type that are moved in the direction of the car movement simultaneously with the steering actuation of the front wheels so as to direct the light rays at all times in the correct path of movement of the car for obviously permitting the driver to see the road when making a turn.

The primary object of the invention is to substantially improve upon and simplify head light constructions of this general type, and this by greatly reducing the number of parts heretofore used for facilitating the proper turning movement of the headlights with the result that little or no interference is encountered in the correct steering of the machine and to reduce to a minimum the rattling and other disagreeable noises usually resultant by the installation of dirigible headlight.

Other objects will become apparent as the nature of the invention is better understood, the same comprising the novel form, combination, and arrangement of parts hereinafter more fully described, shown in the accompanying drawing and claimed.

In the drawing wherein like numerals indicate like parts throughout the several views:

Figure 1 is a fragmentary front end elevation of the conventional automobile equipped with our improved dirigible headlight construction.

Figure 2 is a top plan view of the invention in assembled condition, and in association with the automobile, the complementary units of which are disclosed in dotted lines.

Figure 3 is an enlarged detail longitudinal section taken substantially upon the line 3—3 of Figure 2, for more clearly disclosing the operating connection between the headlight control shaft, and the rod connecting the same to the steering rod of the vehicle steering mechanism, and Figure 4 is a perspective of the steering mechanism controlled headlight connecting rod actuating unit of the present invention.

Now having particular reference to the drawing, 5—5 designates a pair of vehicle headlights of generally conventional construction provided with depending posts 6—6 that are arranged for rotation in bearings 7—7 adjacent the opposite ends of a horizontally extending supporting rod 8 arranged at the front of the vehicle radiator and rigidly anchored at its opposite ends to the adjacent skirt portions of the front wheel fenders 9—9. The lower ends of the lamp posts 6—6 are provided with forwardly extending arms 10—10 to the outer ends of which are pivotally attached the opposite ends of a connecting rod 11 so as to facilitate the actuation of both headlights when said rod is moved.

Mounted horizontally beneath the front end of the vehicle floor board and above the front axle thereof is a longitudinally extending shaft 12, the forward end of which is guided through the frame of the vehicle radiator while the rear end thereof is journaled within a bracket 13 secured to the underside of the adjacent vehicle frame bar as disclosed in Figure 3. Secured to and depending from the shaft 12 adjacent its rear end is an arm 14 to the lower end of which is pivotally secured as at 15 the adjacent end of a connecting rod 16, the inner end of which is pivotally secured as at 17 to the steering rod of the vehicle steering mechanism as disclosed in Figure 2.

Attached to the forward end of the shaft 12 is a laterally inwardly extending arm 18 that is pivotally secured at its inner end to a vertically extending arm 19 that is in turn pivoted at its upper end to the inwardly extending horizontal arm of a bell crank 20 that is pivoted to the lower forwardly offset end of a bracket plate 21 that is clamped to the headlight supporting rod 8 as indicated by the reference character 22. The vertical arm of said bell crank 20 is formed with an elongated vertical slot 23 within which is loosely arranged a forwardly projecting pin 24 formed upon or associated with the headlight connecting rod 11.

It will thus be seen that as the steering rod of the vehicle steering mechanism is actuated by the operator of the vehicle, the shaft 12 will be partially rotated for obviously moving the headlights 5—5 in the direction the front wheels of the vehicle are turned, resulting in the illumination of the road in the direction of travel of the vehicle.

Having thus described the invention, what we claim as new and desire to secure by Letters Patent is:—

A dirigible headlight construction for automobiles comprising in combination, a pair of headlights mounted for rotation at the front of the automobile, posts depending from the headlights, a headlight supporting rod extending horizontally in front of the vehicle radiator and being connected at its opposite ends to the front fenders of the vehicle, and having openings through which the posts extend, a cross rod interconnecting the headlight posts to facilitate the simultaneous operation thereof, a shaft arranged longitudinally beneath the body of the automobile, means for interconnecting the inner end portion of the shaft with the steering mechanism of an automobile, a bracket clamped at its upper portion to said headlight supporting rod, the lower portion of the bracket being offset, a bell crank lever pivoted on said offset portion, the outer end of the horizontally disposed arm of said bell crank lever being operatively connected to the outer end of said shaft, the vertical arm of said bell crank lever being slotted, and a forwardly projecting pin carried by the aforementioned cross rod and operable within the slotted vertical arm of the bell crank lever whereby said cross rod is actuated to turn the headlights simultaneously with the turning of the steering wheels of the automobile.

In testimony whereof we affix our signatures.

SQUIRE FRANKLIN FLETCHER.
HARRY J. SMITH.